(12) United States Patent  (10) Patent No.: US 9,022,081 B2
Armstrong et al.  (45) Date of Patent: May 5, 2015

(54) APPARATUS AND METHOD FOR PREPARING INGREDIENTS FOR A BABY BOTTLE

(75) Inventors: Cara A. Armstrong, Simi Valley, CA (US); Robin D. Richards, Calabasas, CA (US)

(73) Assignee: Baby Barista, Inc., Calabasas, CA (US)

( * ) Notice: Subject to any disclaimer, the term of this patent is extended or adjusted under 35 U.S.C. 154(b) by 66 days.

(21) Appl. No.: 13/565,336

(22) Filed: Aug. 2, 2012

(65) Prior Publication Data

US 2013/0032612 A1  Feb. 7, 2013

Related U.S. Application Data

(60) Provisional application No. 61/514,460, filed on Aug. 2, 2011.

(51) Int. Cl.
*B65B 1/04* (2006.01)
*A47J 31/40* (2006.01)

(52) U.S. Cl.
CPC .................................... *A47J 31/401* (2013.01)

(58) Field of Classification Search
CPC .......... B65D 83/00; B65D 88/54; B67D 7/74; B67D 7/84; B65B 1/04
USPC ............... 426/569, 590; 141/2, 74, 104–105; 366/110; 99/265, 287; 222/129.4, 222/168.5, 196–203, 294–295, 146.5
See application file for complete search history.

(56) References Cited

U.S. PATENT DOCUMENTS

| | | | | |
|---|---|---|---|---|
| 3,162,153 A | * | 12/1964 | Schulz, Jr. | 111/51 |
| 5,803,320 A | * | 9/1998 | Cutting et al. | 222/641 |
| 6,417,498 B1 | * | 7/2002 | Shields et al. | 219/521 |
| 8,360,279 B1 | * | 1/2013 | Giles | 222/145.6 |
| 2004/0129725 A1 | * | 7/2004 | Bertone | 222/129.4 |
| 2005/0145646 A1 | * | 7/2005 | Lautenschlaeger | 222/1 |
| 2005/0242120 A1 | * | 11/2005 | Sato et al. | 222/146.6 |
| 2010/0282781 A1 | * | 11/2010 | Kinzie et al. | 222/239 |
| 2010/0320233 A1 | * | 12/2010 | Krause et al. | 222/135 |
| 2012/0088022 A1 | * | 4/2012 | Carbone et al. | 426/506 |

\* cited by examiner

*Primary Examiner* — Paul R Durand
*Assistant Examiner* — Andrew P Bainbridge
(74) *Attorney, Agent, or Firm* — Martine Penilla Group, LLP

(57) ABSTRACT

An apparatus for preparing infant formula to be supplied to a bottle, and methods and circuits for operating the same, are disclosed. The apparatus includes a housing having a shape for integrating together components of the apparatus. A fluid reservoir for holding fluid and configured to be coupling to the housing is provided. Further provided is a formula disc disposed at a first location of the housing. The first location defined above a dispense location of the bottle, and the formula disc having a top end and a dispense end, the formula disc further includes a plurality of slots for holding the infant formula in a powder state. The apparatus has an end plate that is coupled to the dispense end of the formula disc, and the end plate has a dispense hole, such that the end plate is rotatable relative to the formula disc.

8 Claims, 18 Drawing Sheets

APPARATUS AND METHOD FOR PREPARING INGREDIENTS FOR A BABY BOTTLE

CLAIM OF PRIORITY

This application claims priority to U.S. Provisional Patent Application No. 61/514,460, filed on Aug. 2, 2011, entitled Apparatus and Method for Preparing Ingredients for a Baby Bottle, which is herein incorporated by reference.

FIELD OF THE INVENTION

The present invention relates to an appliance that is used to prepare formula used to feed infants, and related methods for preparation.

BACKGROUND

Prior art has exclusively focused on creating a device that can be housed in an infant's nursery. To this end, prior art has had to address methods to decrease the noise of operation so that it would not disturb a sleeping baby. Formula feeding an infant requires easy access to supplies like bottles, nipples, bottlebrushes, sterilizing containers and water. Bottles that have been used need to be washed in a timely fashion. Formula spoils and smells within one hour of preparation if not refrigerated. This makes it impractical to use an automatic infant formula maker outside of the kitchen.

It is in this context that the embodiments of this invention arise.

SUMMARY

An apparatus for preparing infant formula to be supplied to a bottle, and method for operating the same, are disclosed. The apparatus includes a housing having a shape for integrating together components of the apparatus. A fluid reservoir for holding fluid and configured to be coupling to the housing is provided. Further provided is a formula disc disposed at a first location of the housing. The first location defined above a dispense location of the bottle, and the formula disc having a top end and a dispense end, the formula disc further includes a plurality of slots for holding the infant formula in a powder state. Also included as part of the apparatus is an end plate that is coupled to the dispense end of the formula disc, and the end plate has a dispense hole, such that the end plate is rotatable relative to the formula disc to enable alignment of the dispense hole to any one of the plurality of slots of the formula disc. A circuit is provided for controlling rotation of the end plate or formula disc to cause a vertical drop of formula, when present in one of the slots of the formula disc, into the bottle and to cause a delivery of the fluid, when present in the reservoir, directly into the bottle. The apparatus also has an agitation device for generating movement of the bottle when present. The movement is configured for causing a mixing of the formula and fluid within the bottle.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

With this in mind, the apparatus described herein is an electric appliance that is defined for the preparation of a baby's bottle. As used in this document, reference to embodiments of the apparatus is made by calling out the current product name "Baby Barista," however, it should be understood that the apparatus can take on any name, and the name "Baby Barista" is only used for ease of reference.

Broadly speaking, the apparatus described herein is configured to receive inputs that are processed and then delivered into a bottle. The inputs, in one embodiment, include water and formula. In one example, the formula is a food product that is provided to the apparatus in the form of a powder. The inputs are then processed to accurate proportions before being identified as ready for serving.

Figure 1A:
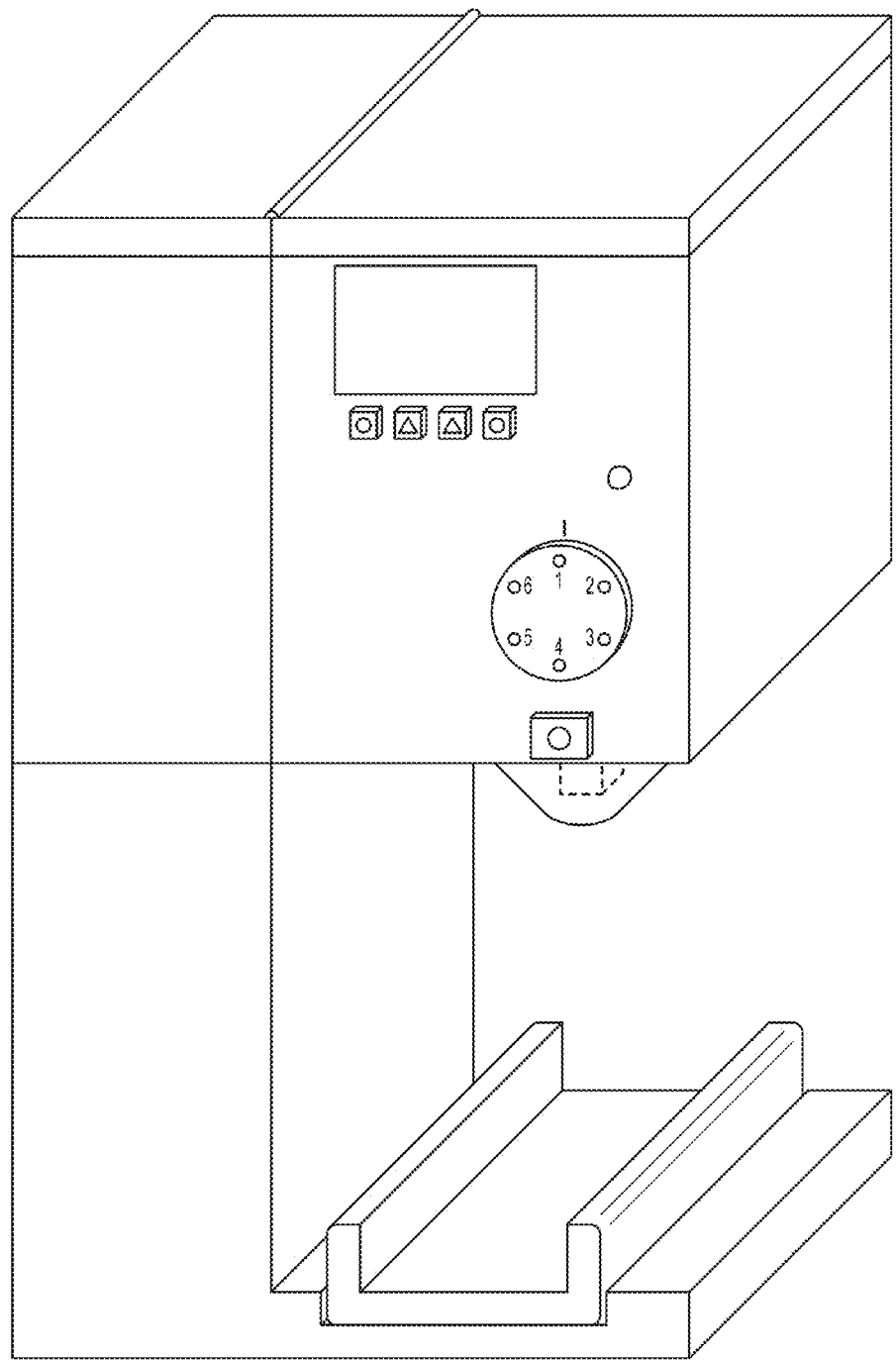
FIG. 1A shows a perspective view of one configuration of an appliance for preparing a baby bottle, in accordance with one embodiment of the present invention.

FIG. 1A shows a perspective view of one configuration of an appliance for preparing a baby bottle, in accordance with one embodiment of the present invention. As shown, the appliance includes a base for providing agitation when a bottle is present, a splashguard that is present near the opening of the bottle when present, and LCD screen with a plurality of buttons shown on the face. The buttons can include a menu button, an arrow up or down button, a select button, etc.

Also shown in the face is a scoop dial selection indicator, which is used to set the machine in accordance with a number of scoops present in each of the slots of a formula disc, as described below. If each slot in the formula disc includes 1 scoop, the scoop dial selection indicator will be set to 1 scoop. If each slot in the formula disc includes 4 scoops (i.e., is filled with 4 scoops of dry powder), for example, then the scoop dial indicator will be set to 4. The scoop amount can also be set through other input mechanisms, such as one or more buttons, input screens or touchscreens.

Also shown is a start button located below the scoop dial selection indicator, that can be pressed to begin the process, based on a program schedule input through the buttons and the selections made on the LCD display. In one embodiment, the LCD screen can be replaced with a touchscreen to provide touch gesture inputs and selections directly into the screen, avoiding the need for buttons. Also shown is a light indicator above the scoop dial selection indicator, which may be used to signify that a bottle is ready, in addition to any alarm provided by a speaker. Further shown is the internal chamber that defines a direct path from the formula disc down into the bottle, as described below. Additionally, the top region of the appliance includes one door over the right side for providing access to or removal of the formula disc, and a door over the left side for providing access to a water chamber.

Figure 1B:
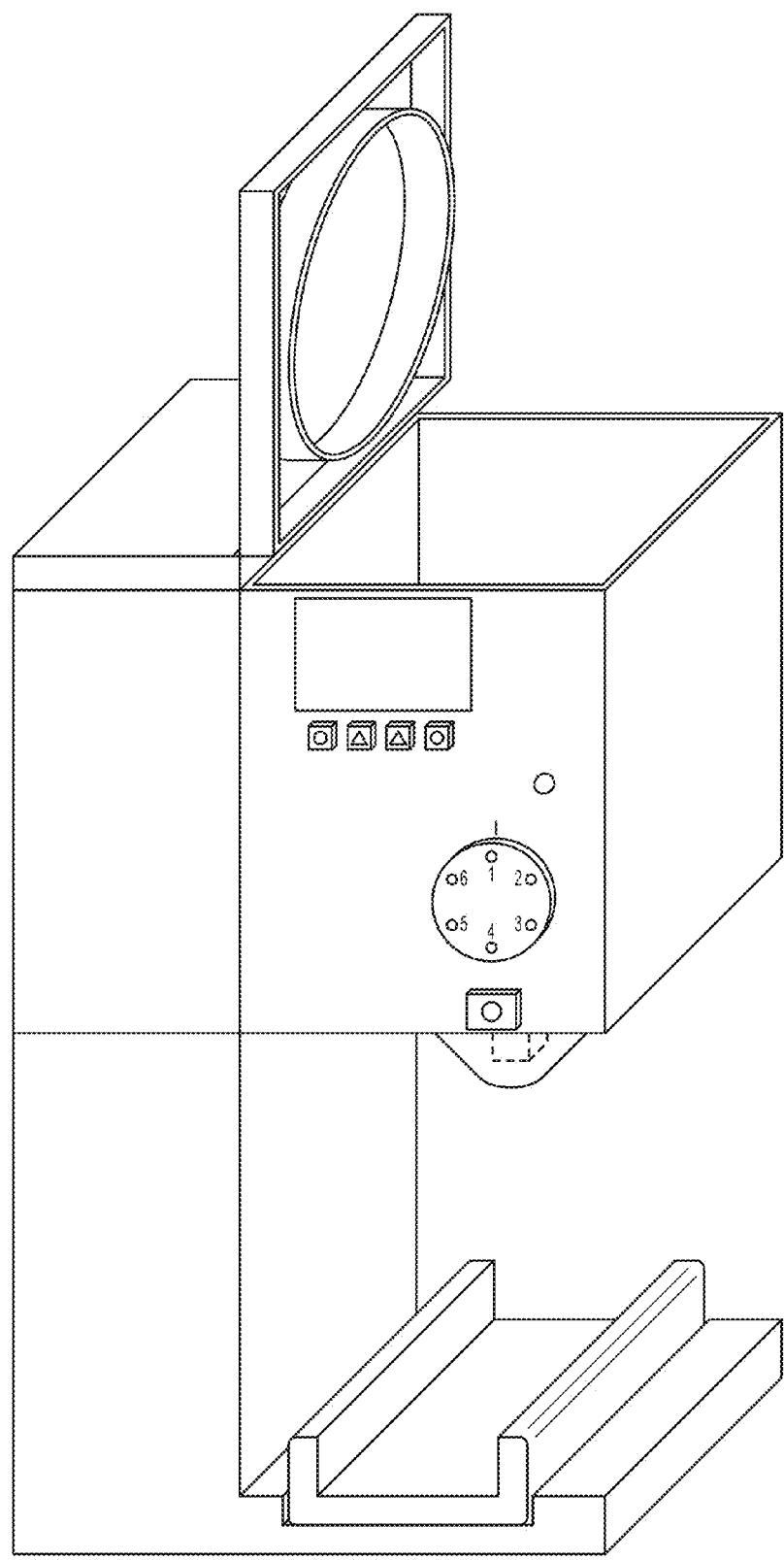
FIG. 1B illustrates the embodiment of FIG. 1A, having one lid open, in accordance with one embodiment of the present invention.

FIG. 1B illustrates the embodiment of FIG. 1A, having one lid open, in accordance with one embodiment of the present invention. The lid is shown to include one or more gaskets, O-rings, or plastics, that provide sealing of the compartment when the formula disc is inserted with formula.

Figure 1C:
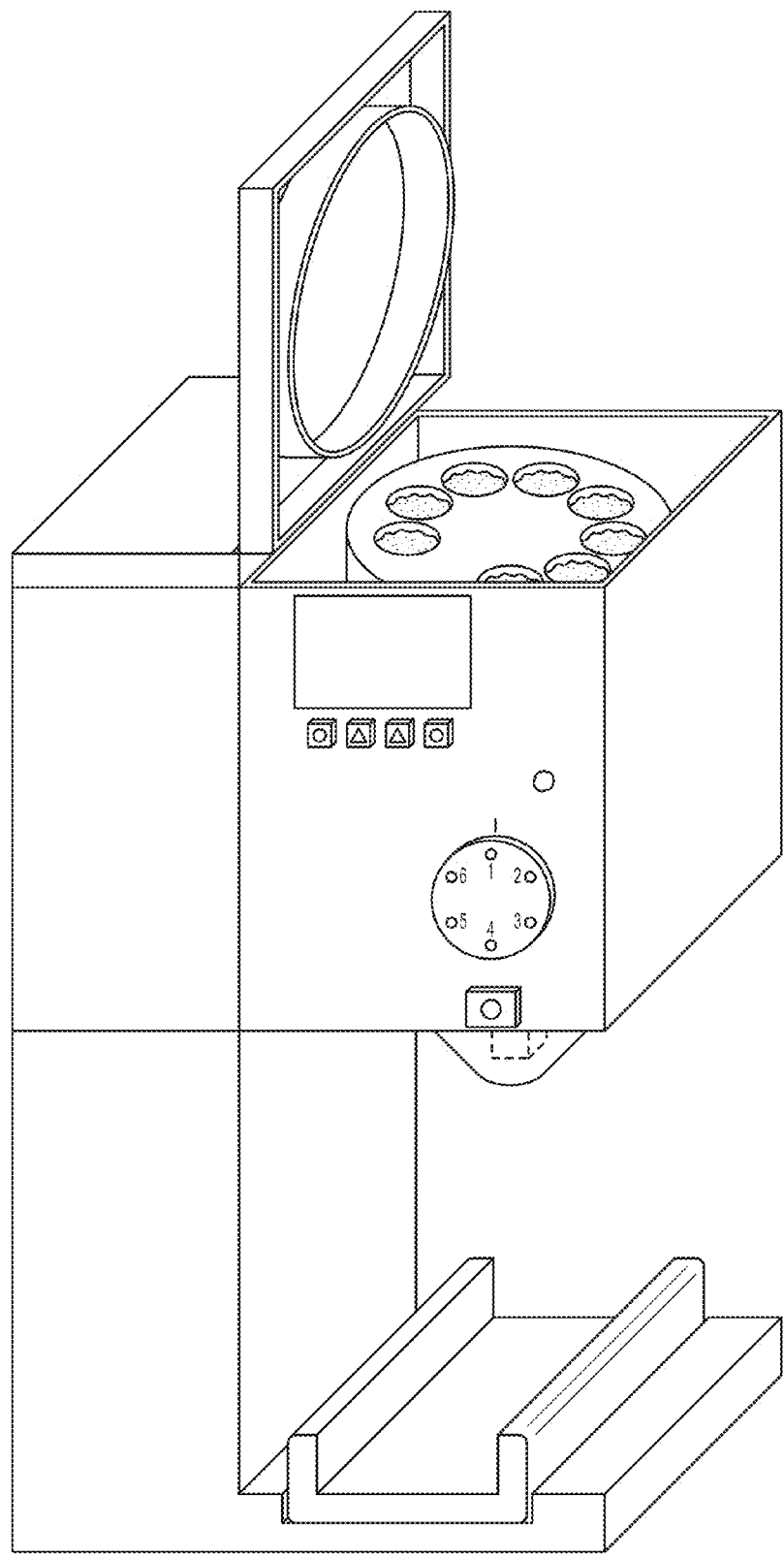
FIG. 1C illustrates the embodiment of FIGS. 1A and 1B, where a formula disc is inserted into the open lid compartment, and the formula disc is shown to include one or more scoops and each of the slots of the formula disc, in accordance with one embodiment of the present invention.

FIG. 1C illustrates the embodiment of FIGS. 1A and 1B, where a formula disc is inserted into the open lid compartment, and the formula disc is shown to include one or more scoops and each of the slots of the formula disc, in accordance with one embodiment of the present invention. The formula disc can be easily removed to fill the slots, or can remain in the appliance when filled.

Figure 1D:
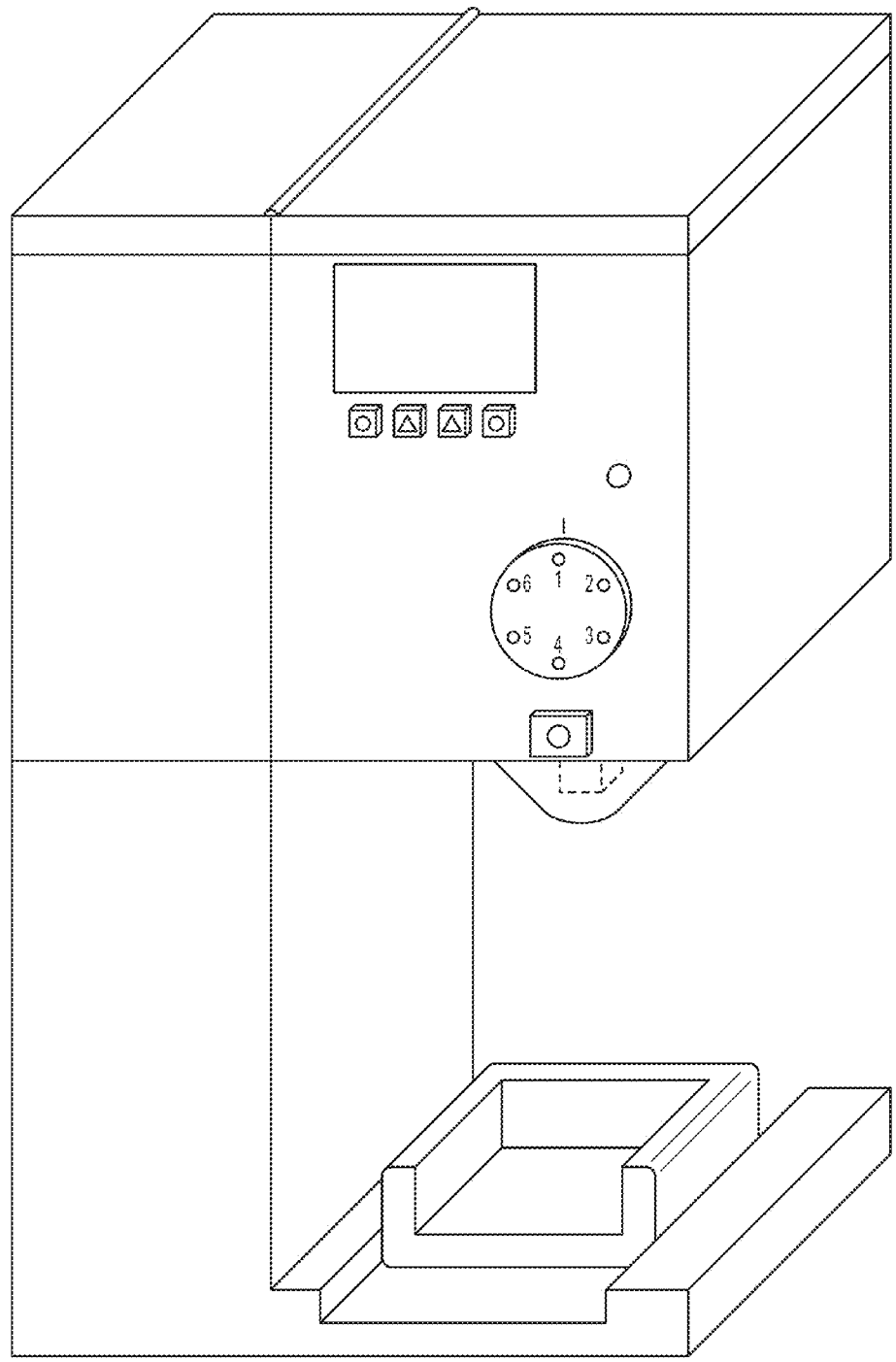
FIG. 1D illustrates another embodiment, where an agitation holder is provided at a bottom portion of the appliance, in accordance with one embodiment of the present invention.

FIG. 1D illustrates another embodiment, where an agitation holder is provided at a bottom portion of the appliance, in accordance with one embodiment of the present invention. As described below, the agitation mechanism can take on various forms, and the objective is to mix the dry powder with fluid.

Figure 1E:
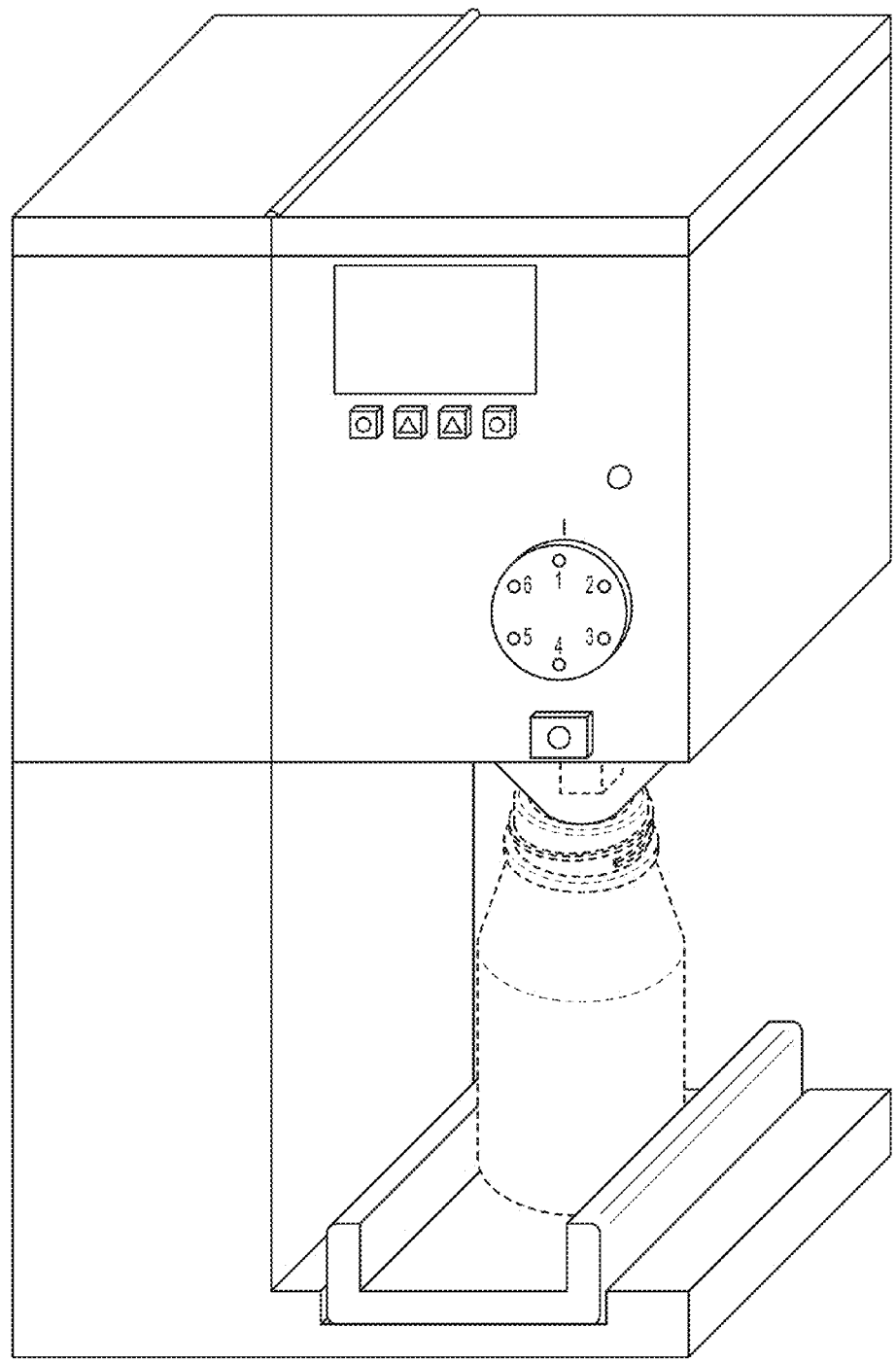
FIG. 1E illustrates another embodiment where a splashguard is provided in accordance with one embodiment of the present invention.

FIG. 1E illustrates another embodiment where a splashguard is inserted, placed or connected to an opening of a bottle, which is located on a holder that is configured to provide agitation to mix powdered formula with warm water, in accordance with one embodiment of the present invention.

Figure 1F:
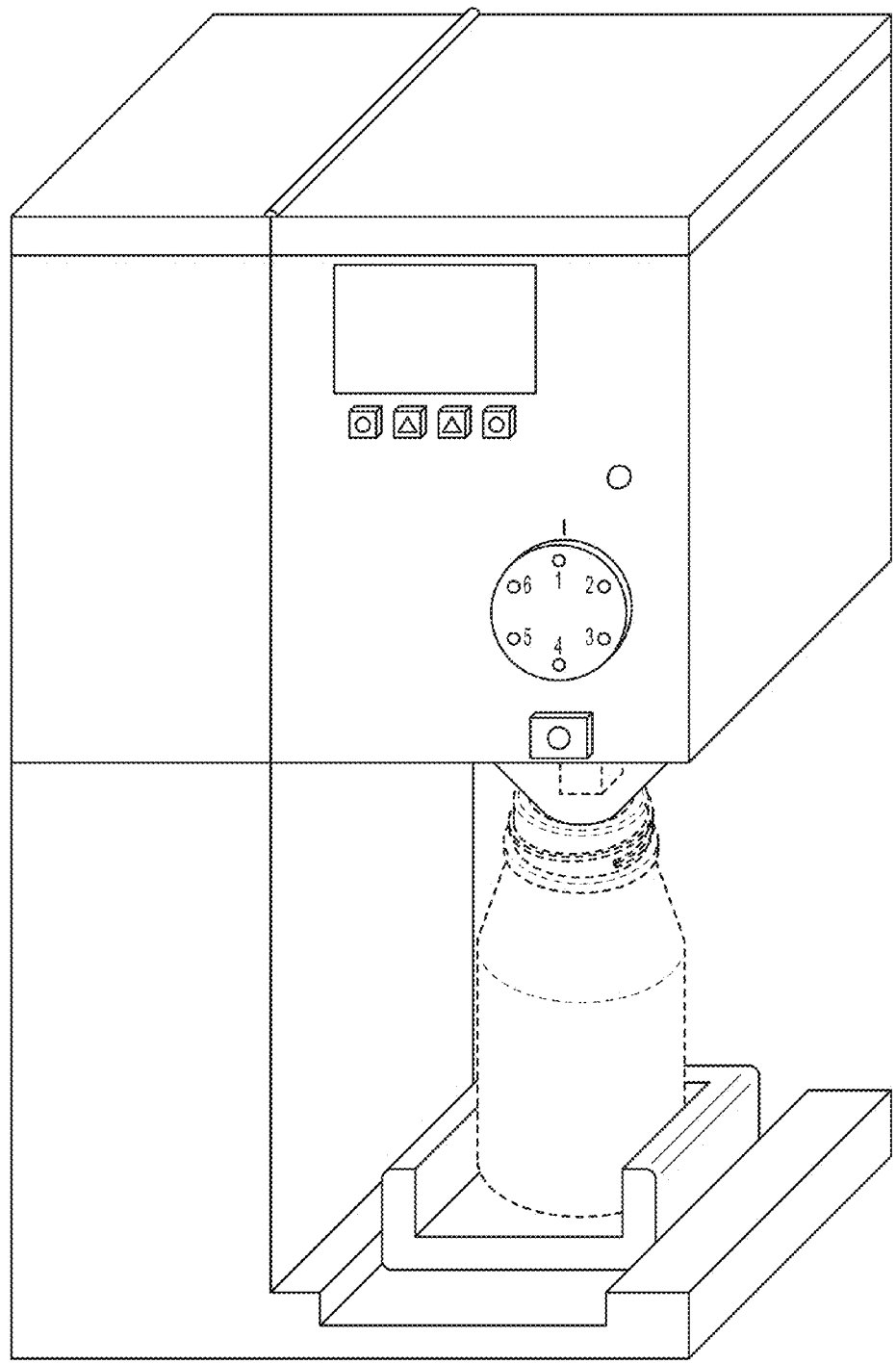
FIG. 1F as illustrates another embodiment where the holder that provides agitation has a gripping surface arrangement, in accordance with one embodiment of the present invention.

FIG. 1F as illustrates another embodiment where the holder that provides agitation has a gripping surface arrangement, in accordance with one embodiment of the present invention.

Figure 2A:
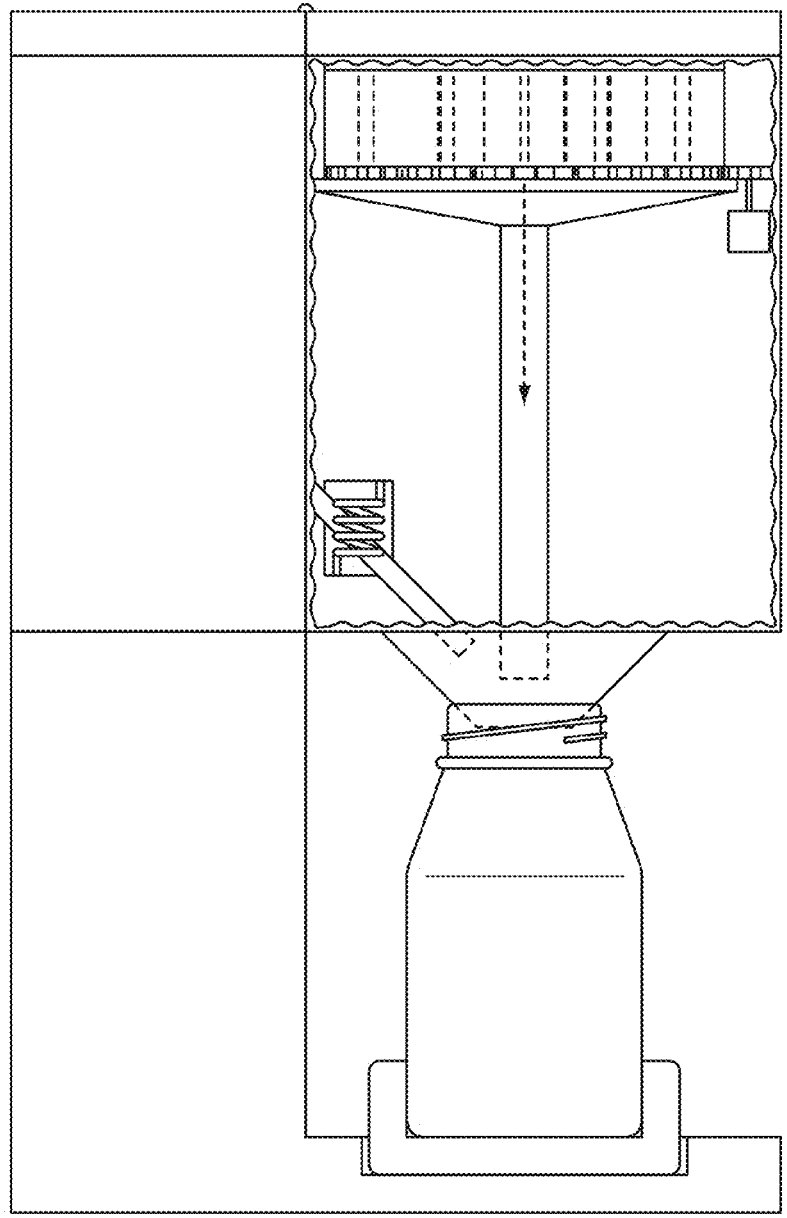
FIG. 2A illustrates one embodiment of the appliance, which shows a cross-sectional view of interior portions of the appliance, in accordance with one embodiment of the present invention.

FIG. 2A illustrates one embodiment of the appliance, which shows a cross-sectional view of interior portions of the appliance, including a conduit for providing warm water to the bottle and a vertical conduit that drops formula from the formula disc directly into the bottle below, in accordance with one embodiment of the present invention. In this figure, a heating coil is also illustrated along the path of a conduit that delivers the fluid at an angle into the bottle. The heating coil can take on any number of configurations to provide the necessary heat exchange to the fluid being provided to the bottle, and to ensure the proper temperature of the fluid being delivered to the bottle.

Figure 2B:
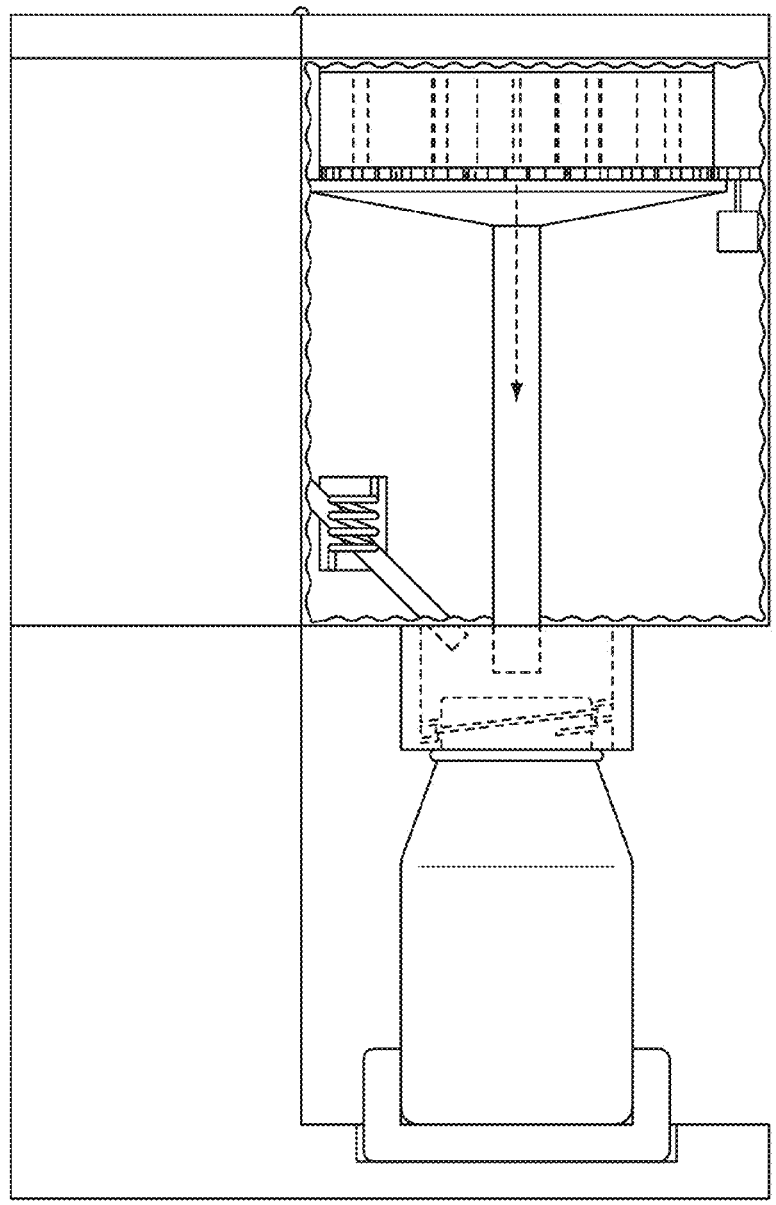
FIG. 2B illustrates another embodiment where a splashguard screws onto the lip of the bottle that is provided, in accordance with one embodiment of the present invention.

FIG. 2B illustrates another embodiment where a splashguard screws onto the lip of the bottle that is provided, in accordance with one embodiment of the present invention.

Figure 3:
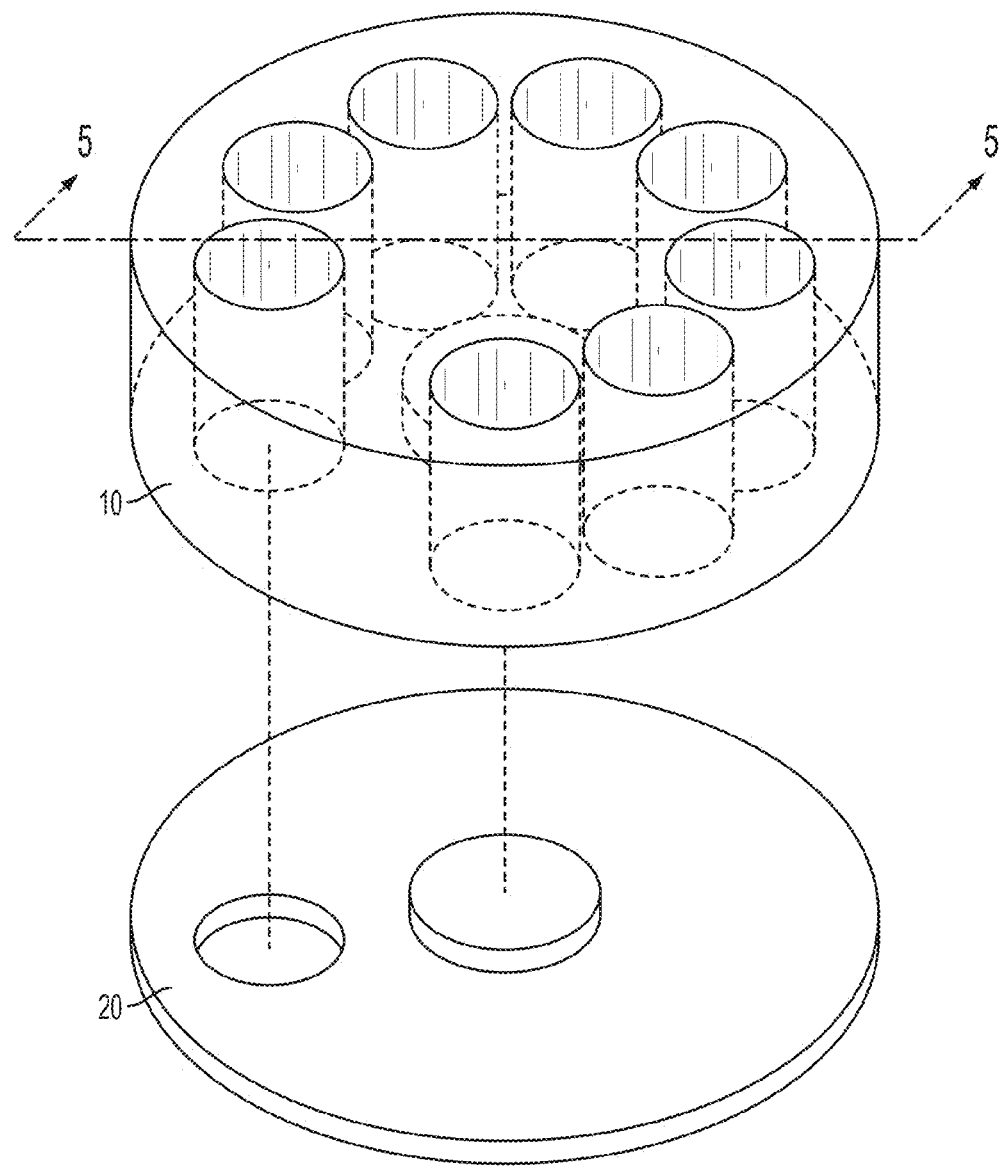
FIG. 3 illustrates a three-dimensional perspective view of the formula disc 10, and an end plate 20, in accordance with one embodiment of the present invention.

FIG. 3 illustrates a three-dimensional perspective view of the formula disc 10, and a end plate 20. The formula disc 10 includes a plurality of slots that will receive formula scoops (one or more), as described below. The end plate 20 secures to the formula disc 10, and is configured to rotate to allow one of the slots in formula disc 10 to line up with a hole in the end plate 20, to deliver and drop formula to the bottle (at the set time), in accordance with one embodiment of the present invention. Although only 8 slots are shown in the formula disc 10, it should be understood that the number of slots can vary, as well as the size of each of the slots.

Figure 4:
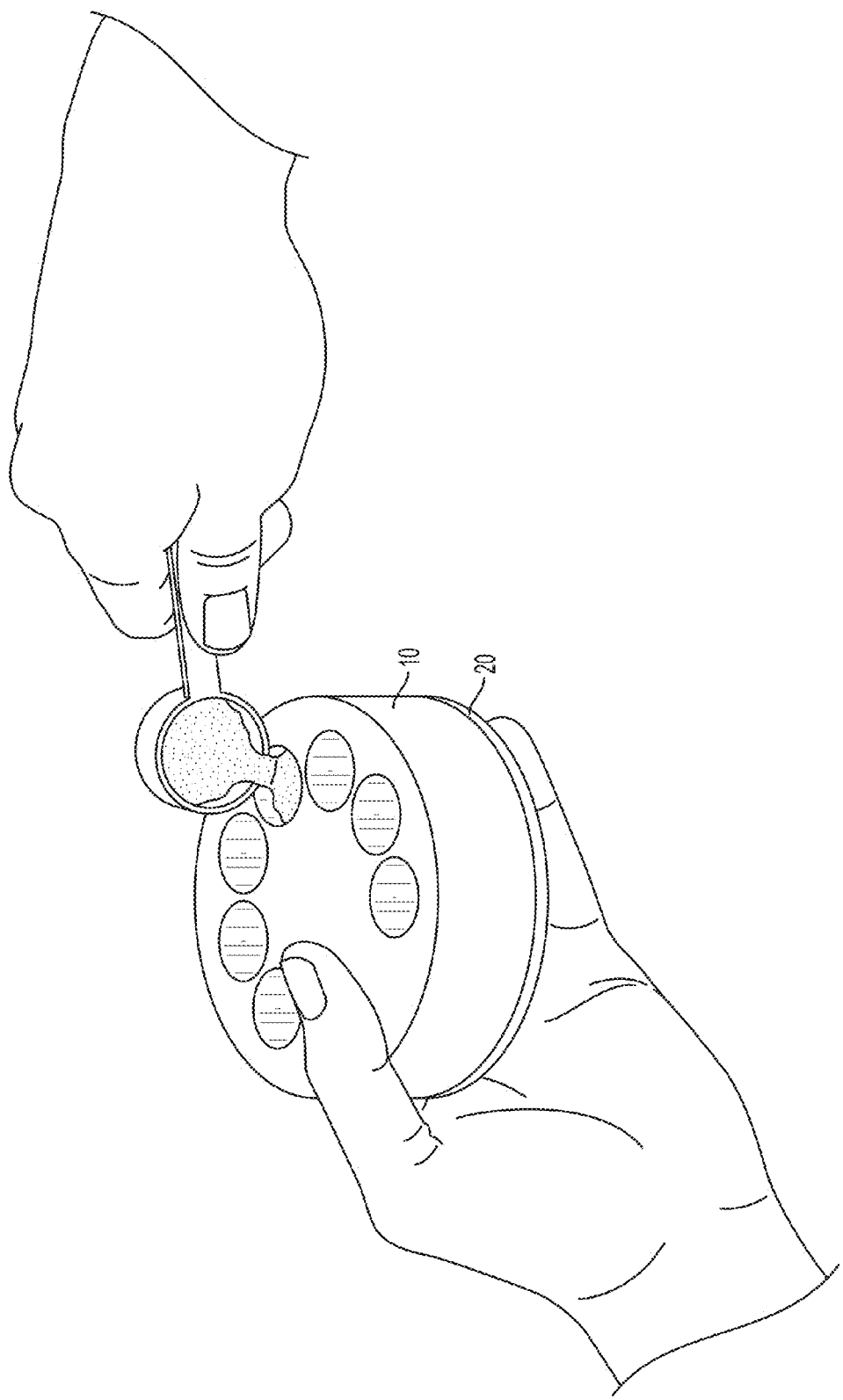
FIG. 4 illustrates a formula disc 10 connected to end plate 20, in accordance with one embodiment of the present invention.

FIG. 4 illustrates a formula disc 10 connected to end plate 20, and a user filling each of the slots in the formula disc 10 with one or more scoops in each slot. The formula disc 10 and end plate 20, in one embodiment, are removable from the appliance to allow easy filling by the user, and then reinserted back into the appliance. In another embodiment, the formula disc remains in the appliance and is not removable.

Figure 5A:
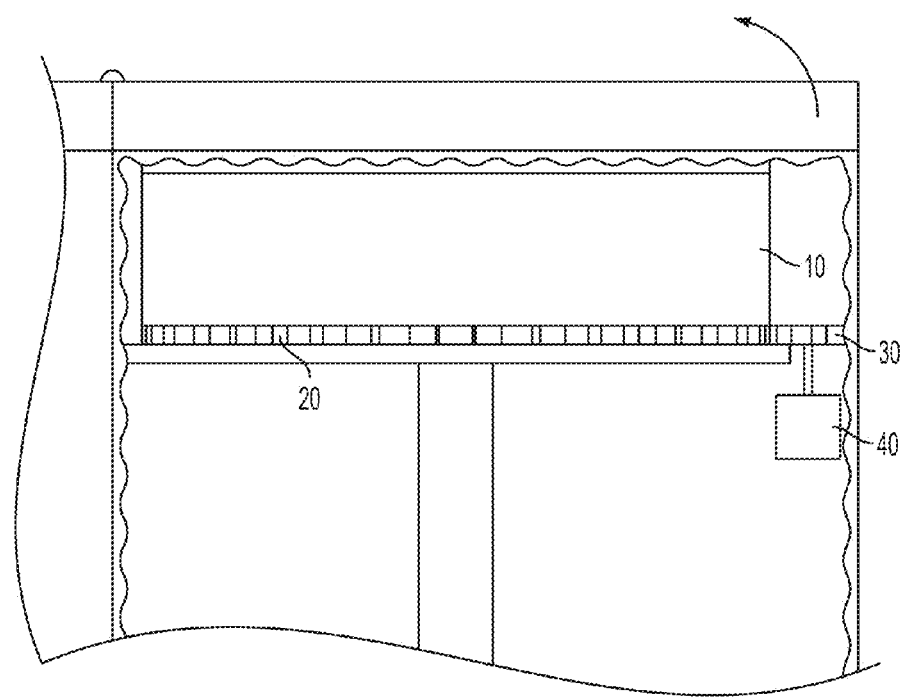
FIG. 5A illustrates one embodiment that allows a motor 40 with gears 30 to connect to mating gears on the end plate 20, in accordance with one embodiment of the present invention.

FIG. 5A illustrates one embodiment that allows a motor 40 with gears 30 to connect to mating gears on the end plate 20, to facilitate rotation of the formula disc 10. The rotation preferably moves the formula disc 10 such that one of the slots in the formula disc 10 is lined up with a hole in the end plate 20, and formula is dropped to the bottle, at the program to time, in accordance with one embodiment of the present invention. Other methods to rotate the devices are possible, such as by belts, pulleys, indexers, and other mechanical levers. The gears and motors show, therefore, represent only one embodiment.

Figure 5B:
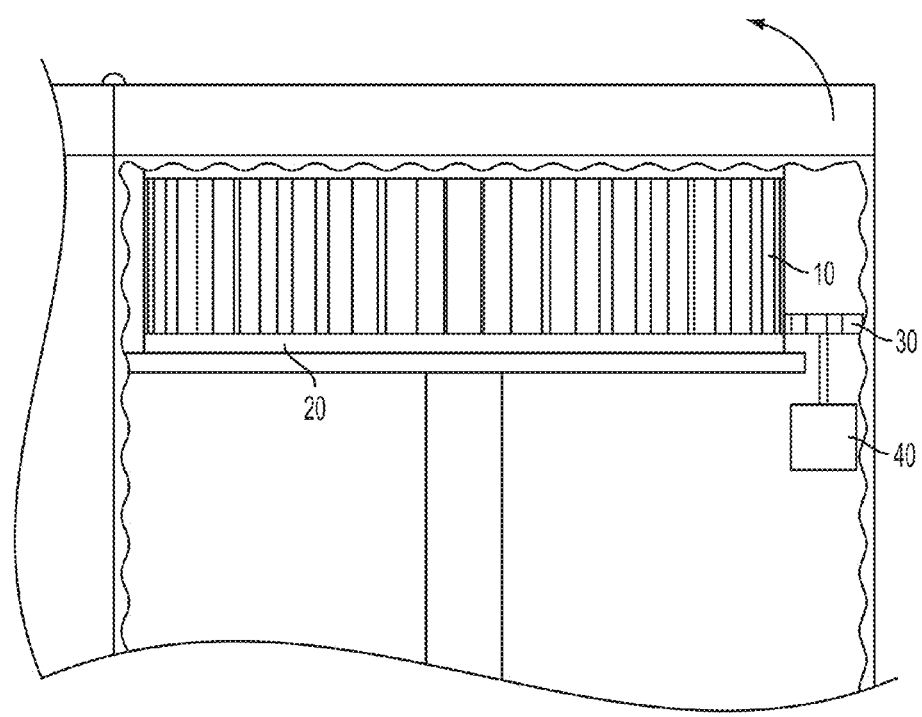
FIG. 5B illustrates an alternative embodiment where the formula disc 10 includes a plurality of mating gears, instead of the end plate 20, in accordance with one embodiment of the present invention.

FIG. 5B illustrates an alternative embodiment where the formula disc 10 includes a plurality of mating gears, instead of the end plate 20, in accordance with one embodiment of the present invention. As shown, a lid is configured to close the top of the appliance once the formula disc 10 and end plate 20 are inserted. In one embodiment, as described below, the lid is provided with substantial airtight security to preserve freshness of the powder contained in the formula disc 10, in accordance with one embodiment of the present invention.

Figure 6A:
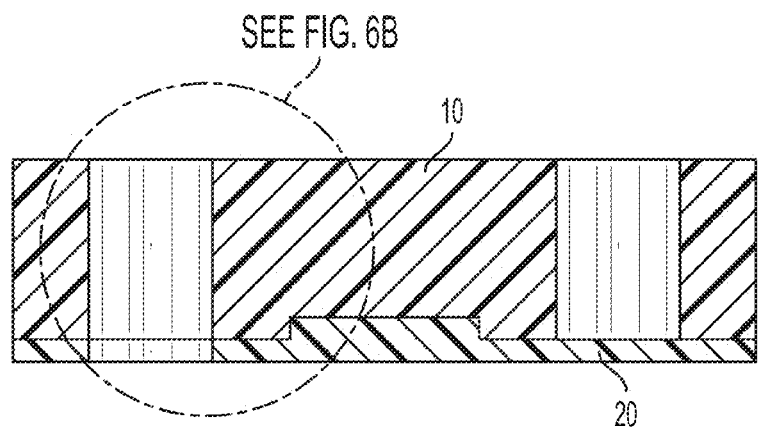
FIG. 6A illustrates a cross-section of the formula disc 10 and end plate 20, in accordance with one embodiment of the present invention.

FIG. 6A illustrates a cross-section of the formula disc 10 and end plate 20. As shown, one of the slots is oriented over the hole in the end plate 20, to allow any contents in the slot of the formula disc 10 to drop or slide down to the bottle below.

Figure 6B:
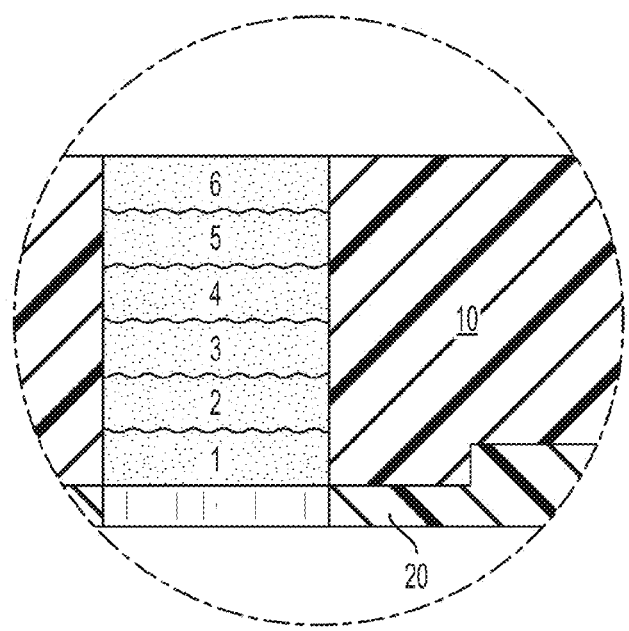
FIG. 6B illustrates an example where the slots in the formula disc 10 include a plurality of scoops of powder, in accordance with one embodiment of the present invention.

FIG. 6B illustrates an example where the slots in the formula disc 10 include a plurality of scoops of powder. In the example, six different levels of scoops are shown to provide an illustration that one or more scoops can be provided in each slot. If the slot, for example, only contains one scoop, when the slot lines up in the formula disc with the hole in the end plate 20, only one scoop will be dropped. If more scoops are present, then more scoops will be dropped, and so on.

Figure 7:
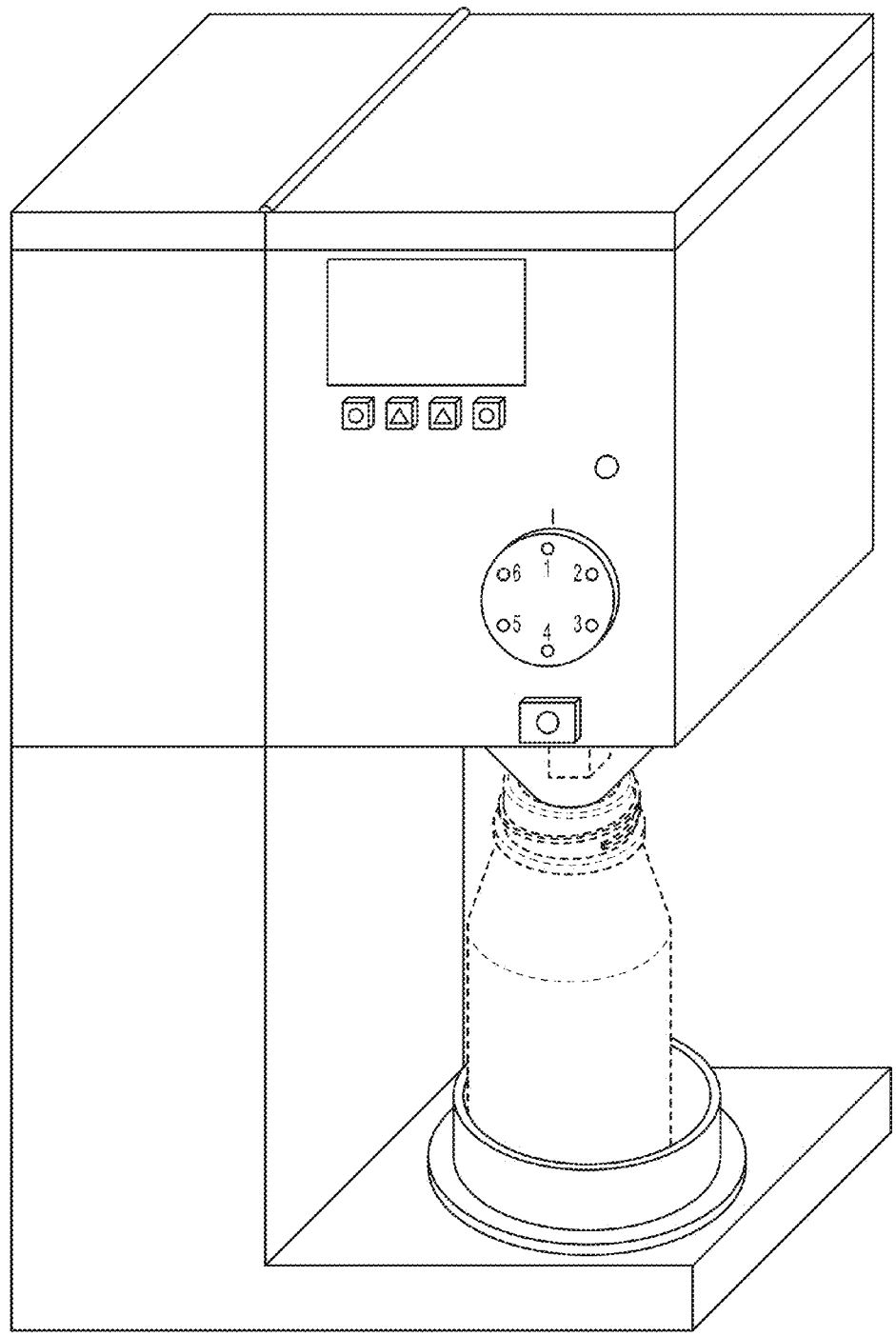
FIG. 7 illustrates an example of the appliance with an end plate 20 with a cup that allows for agitation by way of off-center rotation, in accordance with one embodiment of the present invention.

FIG. 7 illustrates an example of the appliance with an end plate 20 with a cup that allows for agitation by way of off-center rotation, as described below, in accordance with one embodiment of the present invention.

Figure 8:
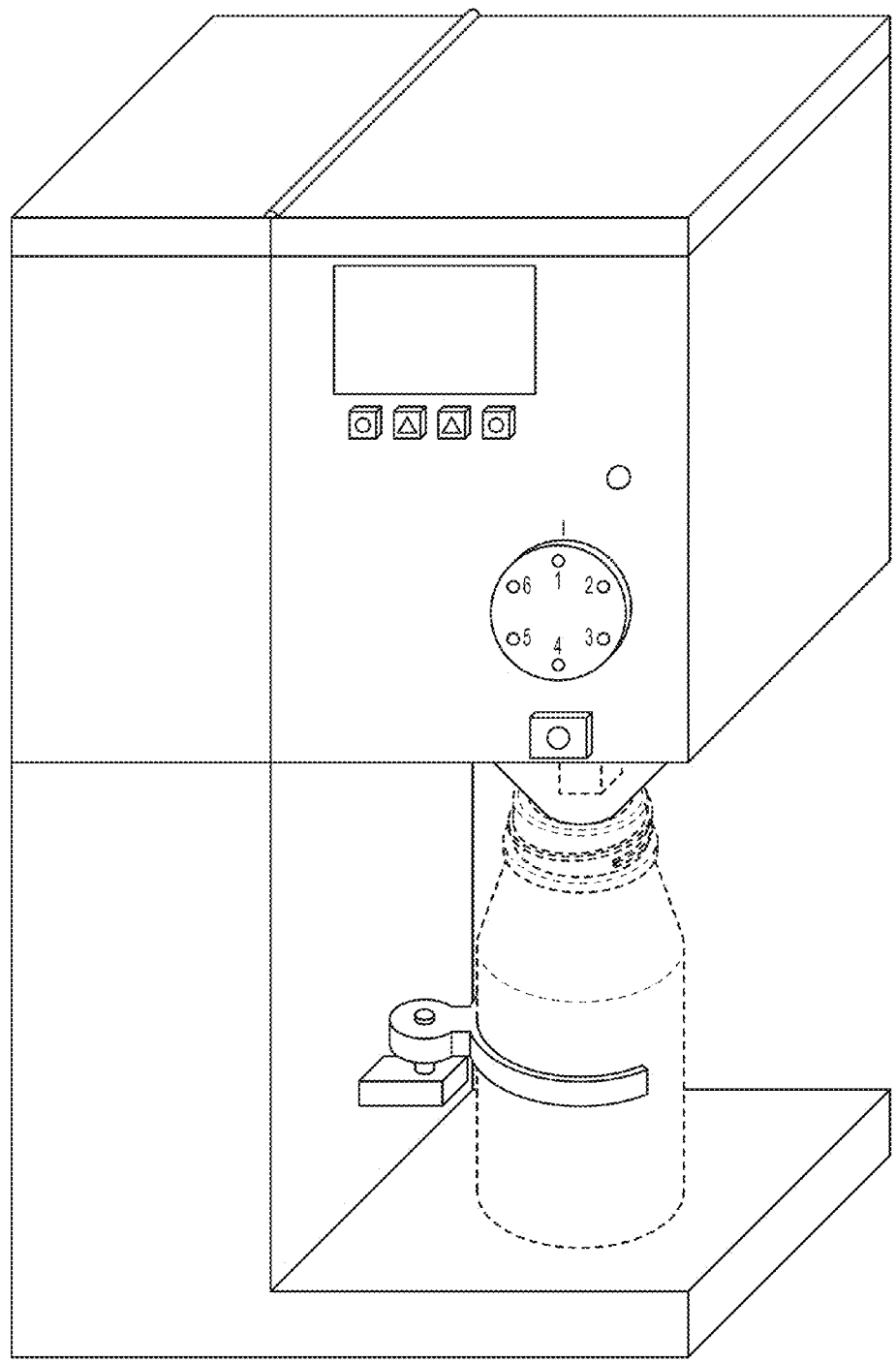
FIG. 8 illustrates another example of the appliance having an arm that grips the bottle to provide agitation, in accordance with one embodiment of the present invention.

FIG. 8 illustrates another example of the appliance having an arm that grips the bottle to provide agitation, in accordance with one embodiment of the present invention.

Figure 9:
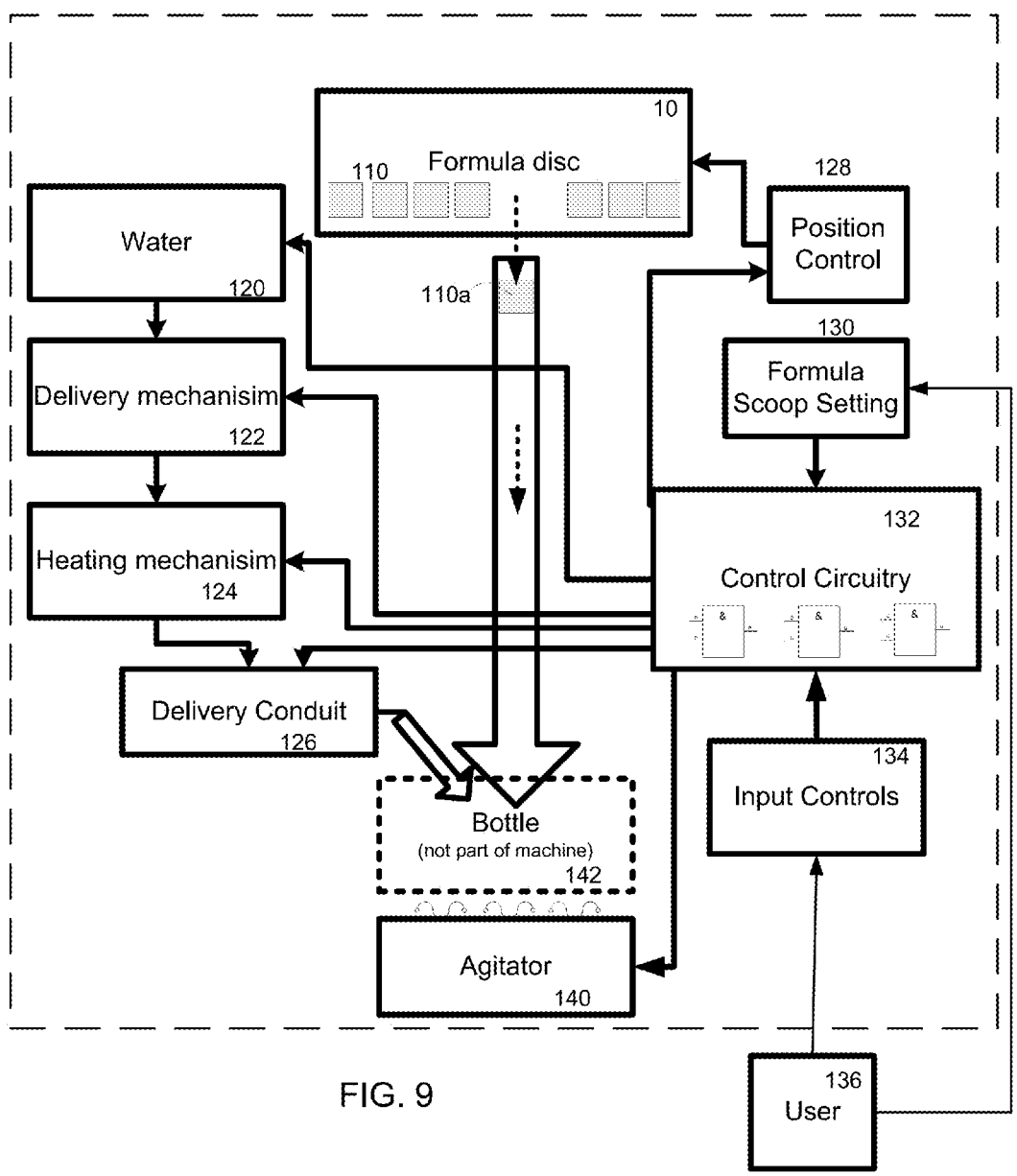
FIG. 9 illustrates a block diagram of the circuitry and control features of the appliance, in accordance with one embodiment of the present invention.

FIG. 9 illustrates a block diagram of the circuitry and control features of the appliance, in accordance with one embodiment of the present invention. Thus, the appliance is configured to be connected to wall power or provided with batteries.

Figure 10:
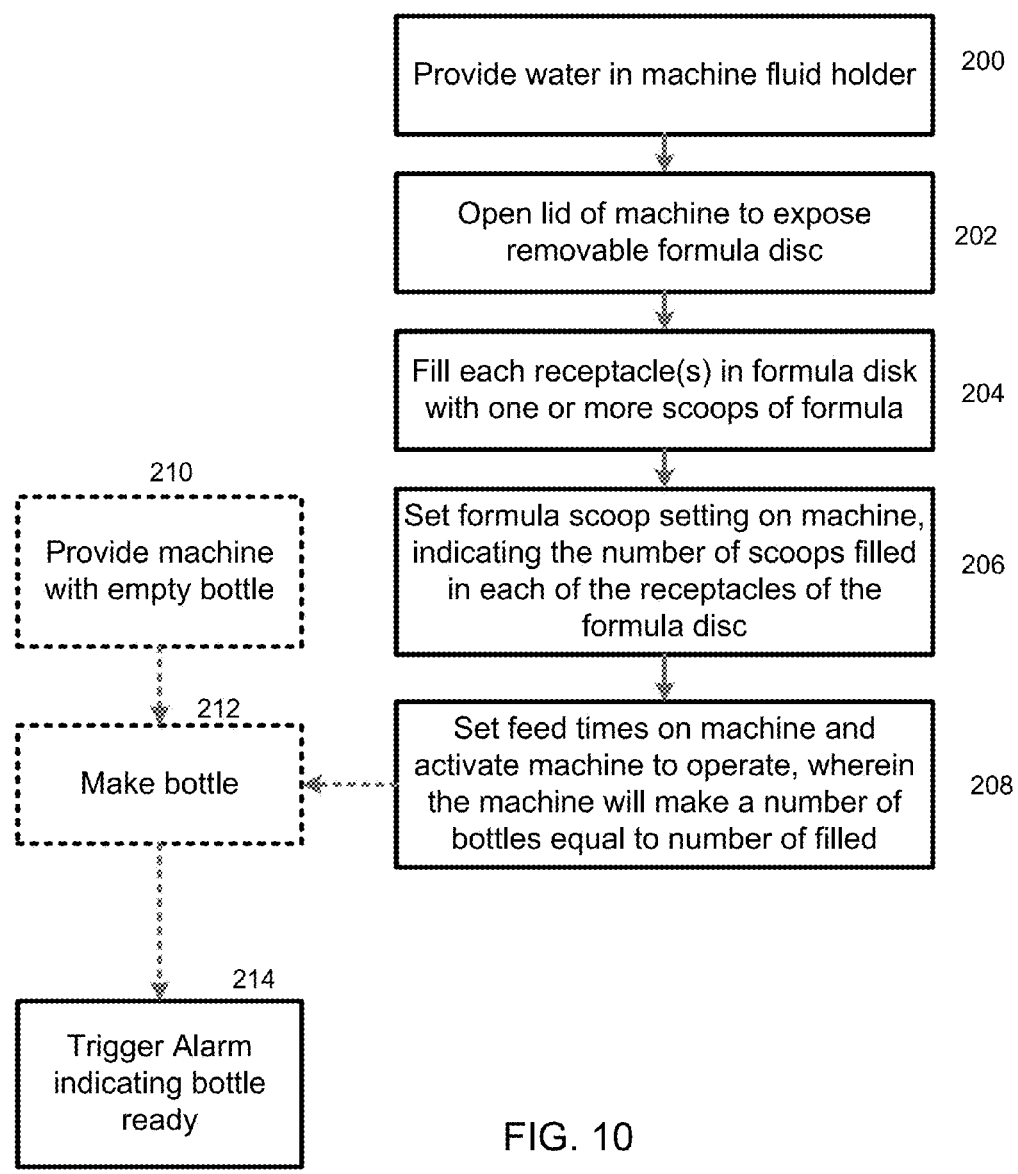
FIG. 10 illustrates a method diagram associated with setting up the appliance for operation, in accordance with one embodiment of the present invention.

FIG. 10 illustrates a method diagram associated with setting up the appliance for operation, in accordance with one embodiment of the present invention.

Figure 11:
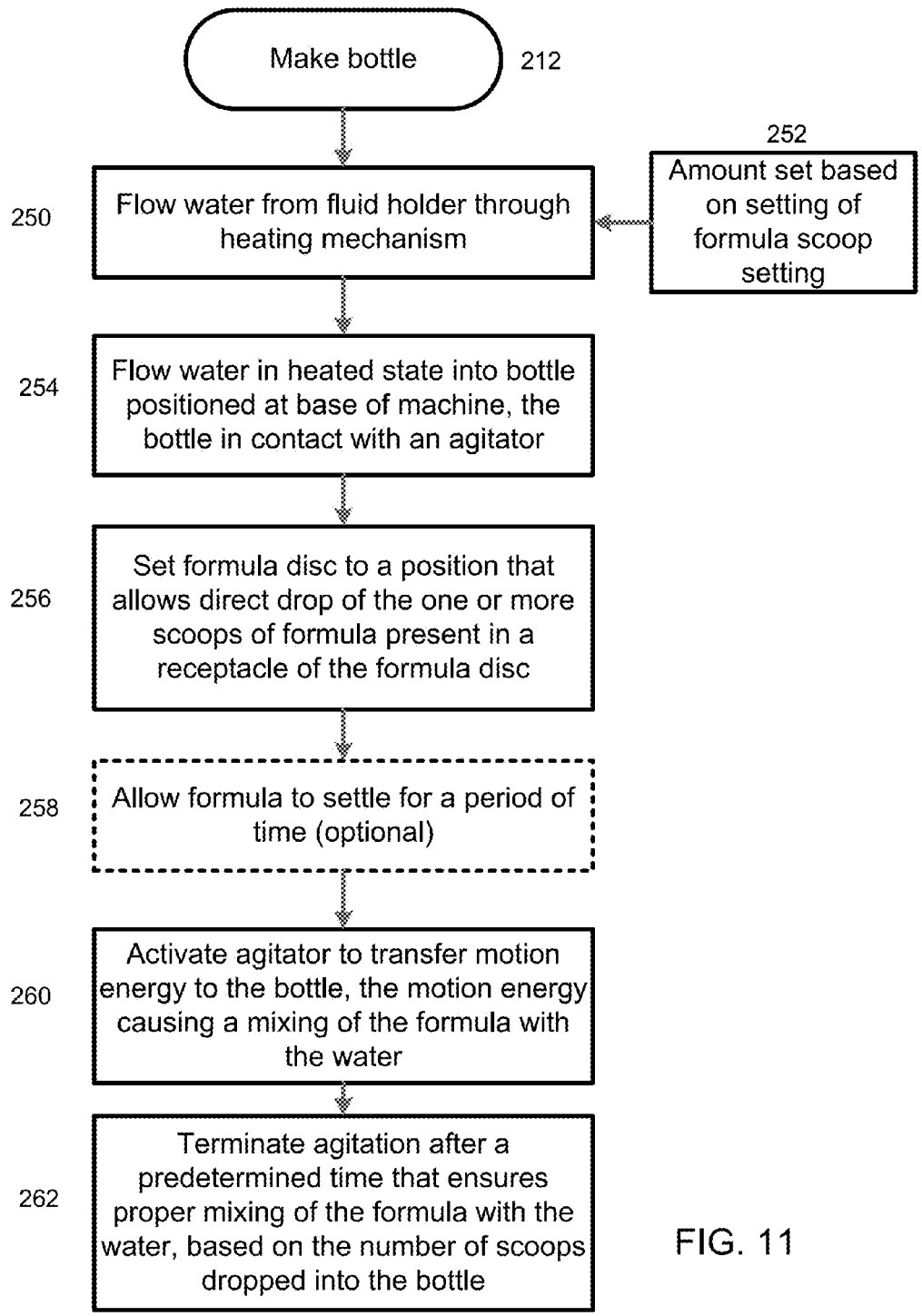
FIG. 11 illustrates an exemplary method operations utilized to make a bottle using the appliance, in accordance with one embodiment of the present invention.

FIG. 11 illustrates an exemplary method operations utilized to make a bottle using the appliance, in accordance with one embodiment of the present invention.

Exemplary Embodiment of Apparatus

The Baby Barista has an external housing unit that is made of plastic or some other rigid material such as aluminum, metal, and the like. The housing unit contains and conceals the inner components of the machine. In one embodiment, the machine has a removable water chamber, a removable formula disc, and end plate that the formula disc sits on, a gear assembly that rotates the said disc to expose the end plate hole, a waterspout that presents at about a 45-degree angle over the baby bottle, tubing connected to the water tank that controls the amount of water that is dispensed in the bottle through the waterspout electronically, a start button that initiates the water fill, powder drop, and agitation device, controlled by a multi-layered circuit board, a feeding tracker composed of an LCD screen and arrow buttons that allow the user to scroll through and select feeding intervals, an alarm to signal completion of the bottle preparing process as well as an alarm to indicate the "need to feed" time.

The Baby Barista has a heating coil that warms the water, not for sterilization purposes, but for the physiological and psychological comfort of the baby and mother respectively.

In one embodiment, the Baby Barista has an agitating plate that sits under a bottle-holding cup or container. The bottle may be placed in this container after the splashguard is secured. In one example, the container sits slightly off center on the plate thus causing agitating motion. An alternative agitating mechanism involves an arm that the bottle is affixed to that initiates an eccentric motion mechanically and returns the bottle to proper alignment with the formula disc dispenser and the angled waterspout. In another embodiment, the agitation is by way of a high frequency vibration device that imparts the energy to the bottle and fluid/powder within.

Exemplary Method of Use

1. Remove, fill and replace the water chamber. In one embodiment, this only needs to be done periodically as the water will make multiple bottles.
2. Scoop eight doses of formula into formula disc and close airtight lid.
3. Secure splashguard and place bottle in holder or affix to agitating arm.
4. Select amount of scoops used on the scoop dial.
5. Press start button. This signals the fill sequence: water fill, powder drop, agitation. This automatic fill sequence is an optimized sequence, in accordance with one embodiment of the present invention.
6. When alarm sounds remove splashguard, bottle and serve.

It should be understood that more or less steps may be used, depending on the desired result. Additionally, in one embodiment, some steps may be performed in other orders.

Exemplary Components of a Baby Barista Machine

The Baby Barista is a freestanding appliance. All components are connected, however, the water chamber may be detachable for easy filling. The formula disc is also removable for loading although loading is possible without removal. It requires electrical power and will be plugged into an electrical outlet.

On/Off button—Turns The Baby Barista on or off.

Housing unit—The external walls of the Baby Barista machine. The housing unit conceals the working parts of the machine.

Water Chamber—A holding tank or reservoir. This chamber is physically isolated from the formula disc and any mechanical devices housed within the machine. It has a lid that prevents airborne particles from entering the chamber. Ideally, it is removable for easy filling and cleaning. In the event that it cannot be removed there is a window that allows the user to see how much water remains in the tank. The capacity of the chamber is three quarts.

Heating Coil—A heating mechanism. The water from the water chamber is directed into a flexible hose or other transport device in the base of the reservoir, which leads to a heating chamber, coil or tube. The water passes through the chamber over the coil or through the tube thereby heating the water to a maximum temperature of 90-100 degrees Fahrenheit, or another predetermined temperature. In one embodiment, the heating mechanism is unable to exceed the maximum temperature thus eliminating scalding risk.

Formula disc—A disc containing eight holes. Each hole houses a cylindrical chamber that is open on the proximal and distal ends. These chambers hold powdered infant formula that is dosed by the consumer. In one embodiment, each chamber may be coated with a material that will facilitate complete emptying of the powdered formula into the baby bottle. Although eight holes are provided in one embodiment, more or fewer holes and variations in hole sizes can be made to accommodate alternative feeding configurations.

Airtight lid—A lid that snaps on top of the formula disc after it is filled with infant formula to protect its integrity. In one embodiment, the lid simply provides a closing process and may or may not be "airtight."

End plate—A plate that has one dispensing hole in therein and is affixed in some manner with screws or otherwise to the bottom of the formula disc. This plate prevents the cylindrical chambers from releasing the pre-dosed amount of formula until the chamber is lined up with the end plate dispensing hole. There is sufficient pressure between the formula disc and end plate to prevent product from slipping between the two surfaces. The gear assembly moves the end plate to the dispensing position and is motor driven.

Scoop dial—A round dial that allows the user to indicate how many scoops have been loaded into one chamber of the formula disc. The denominations on the scoop dial are 1, 2, 3, 4, 5 and 6. Once this dial is set, the start button is pressed. The scoop dial is only changed as the infant advances from one feeding quantity to another. This dial may only be adjusted one time over a period of weeks.

Gear assembly—A gear that the end plate is attached to in some fashion. When the gear assembly is rotated the dispensing hole is lined up with the cylindrical chamber that holds the pre-dosed amount of formula. In one embodiment, a motor operates the gear assembly.

Interval chamber—In one embodiment, a rectangular chamber is directly below the end plate. This chamber allows the formula to drop into the baby bottle unimpeded.

Agitating mechanism—One of three mechanisms to mix the powdered formula with water. The first agitating mechanism is a vibrating plate that sends repetitive periodic oscillations of varying frequencies through the bottle based on the amount of powder and water the machine has dispensed. A second mechanism is a rotating plate on the base of the housing unit. This plate spins underneath the baby bottle. In one embodiment, because the bottle is placed slightly off center, agitation is achieved. The other mechanism is an arm secured to the back of the housing unit. The bottle is affixed to the arm that rotates the base of the baby bottle in an elliptical fashion. When agitation is completed, the arm returns to its position under the interval chamber, and in line with the waterspout to receive the replacement bottle.

Bottle—(not part of the appliance) The container that will hold the powder and water that are combined to make the finished product, ready to use infant formula. The bottle will be marked with lined ounce indicators in order for the consumer to easily determine how much formula the infant has consumed.

Splashguard—A plastic funnel directed or screwed onto the bottle. This will prevent the contents of the bottle from splashing or spilling during agitation.

Circuit board—Electronically triggers the sequence of operations on the machine. That sequence being: water fill, powder drop, agitation and ready to serve alarm. The circuit board can include any number of electrical devices, or chips, which can coordinate the noted functions and other functions that may be needed. The circuit board can also have wireless capabilities, to allow connection and communication over a network.

Bottle ready alarm—A tone that sounds accompanied by a colored light on the housing unit that signals the user that the bottle is ready to serve. The alarm can also be forwarded to a remote location over a wireless link. The forwarding can be over a network or the Internet. The signal can thus be sent to the smartphone or computer of the mother or person in charge of feeding.

Need to feed alarm—A tone that sounds accompanied by a colored light on the housing unit that signals the user that it is time to make a bottle.

LCD Screen—A thin flat electronic display located on the Baby Barista machine. This screen will display various feeding interval options. (For example 2 hours, 3 hours, 4 hours) The user will select the feeding interval from one menu and be able to activate or deactivate the feeding alarm from another menu. The screen can alternatively be a touchscreen, thus eliminating the need for extra buttons.

Menu button—One button under the LCD screen to the left of the arrow buttons which allows the consumer to choose between display options.

Menu options—The user will be able to choose between the feeding interval and alarm menu options.

Arrow Buttons—Two buttons, arrow up and arrow down that allow the user to navigate the menu options on the LCD screen.

Select button—One button that allows the user to select either the feeding interval or alarm menu options.

Start Button—One button that signals the water fill, powder dispensing and agitating mechanisms to begin.

Other buttons—The above noted buttons are only exemplary, and it is conceivable that more or less buttons can be included, and functions added. The buttons can also be replaced by a user interface on a touch screen, and the like.

In one embodiment, the Baby Barista operates outside the nursery. Bottles, nipples, water and other needed supplies are at the user's fingertips. Because its home is away from the nursery, the noise of operation is no longer an issue. It is an improvement over prior art to eliminate the need to exclusively house this machine in an infant's nursery.

One of the most challenging aspects of creating a machine to automatically dispense infant formula involves accurately obtaining a single serving of powder from a central hopper or holding tank. Prior art attempts to dispense an accurate single dose of formula from a central hopper or holding tank, and has fallen short for a number of reasons.

For instance, there are small disparities in the contents of the formula scoops provided in formula containers. The weight of one scoop of formula is not just manufacturer dependent but brand dependent. For instance, one scoop of Enfamil Premium Newborn formula has a weight of 8.7 g, while one scoop of Enfamil Prosobee formula has a weight of 9.0 g. When dosing four scoops, the Enfamil Premium brand weighs 34.8 g while the Prosobee has a weight of 36 g. And when 6 scoops are added, the disparity increases to 52.2 g and 54 g. This makes automated dispensing both complicated and risky. It should be understood that the dosage configurations are purely exemplary in nature, and other dosage sizes may be used.

Proper dosing is a critical issue. Infant formula that is too dilute can cause serious electrolyte imbalances and formula that is too concentrated can put an undue burden on an infant's digestive system.

Prior art has attempted to account for brand dose variation, offering a solution that is both complicated and subject to user error. It requires the end user to engage in a complex process that includes calibrating the tare weight of the baby bottle, manually calibrating new formula types by making entries onto a computer screen, and calibrating water weight to indicate serving size. This makes automated dispensing both complicated and risky.

Because the machine is dispensing the powder into the bottle in an automated fashion, the end user has no means for verifying dose accuracy. Prior art is relying solely on the machine to provide the infant with an appropriate dose. User verification of dose accuracy is essential to the health and well-being of an infant. After taking all of these steps, the consumer still has to manually agitate the contents of the bottle.

It is interesting to note that all prior art utilizing powdered formula has used a central hopper. That hopper holds a large predetermined volume of powdered formula. Prior art using a central hopper has had to address and overcome the issue of product settling and clumping. This requires blade mechanisms to agitate the powder in order to adequately separate particles.

Assuming that the powder is separated correctly, it still must transition in some fashion from the hopper to the bottle. Common transitioning chambers in prior art are funnelshaped. Due to the fine granulation of infant formula, it is reasonable to assume that residue could potentially accumulate in that transitioning chamber. That accumulation could hinder product movement, adding to dosing difficulties.

In one embodiment, the Baby Barista has a removable formula disc with eight separate chambers. As noted above, the number and size of chambers can vary, depending on the implementation. Further, the consumer may use any brand of formula, loading the chambers according to manufacturer specifications. Insuring both accuracy and convenience, this is an improvement over prior art.

During use, the consumer removes the formula disc from the machine and manually scoops the appropriate amount of formula into all eight chambers. The eight cylindrical chambers can accommodate 54 g of powdered infant formula. (6 scoops of 9.0 g granulated food product)

In one embodiment, the inside of each chamber may be coated with a material that will reduce friction and/or prevent powder from adhering to the walls of the cylinders. The formula disc is replaced after filling and is sealed with an airtight lid (or closed lid). A lid protects product integrity.

Unlike the central hopper models, the Barista formula disc utilizes the loaded powder in twenty-four hours. This keeps the formula fresh and eliminates the need for blade agitation.

In one embodiment, the formula disc sits on an end plate. This plate prevents the powder from being released upon loading. The plate allows the dosed amount of formula to fall into the bottle when it is rotated mechanically and a hole is exposed.

In one embodiment, the formula will be falling in a vertical fashion rather than through a funnel, so that powder does not adhere to the interval chamber walls. Therefore the interval chamber allows a complete dose to be dispensed into the bottle. In one embodiment, it is rectangular in shape, although, other shapes are also envisioned.

Water Supply

The water is housed in a removable chamber for easy filling and cleaning. It must travel from this chamber into a dispensing spout that is positioned at about a 45-degree angle (or some angle, depending on the configuration) over the baby bottle. Dispensing the water from an angled position is one embodiment of the Baby Barista.

In one embodiment, the amount of water dispensed is regulated electronically based on the end user's selection on the Baby Barista scoop dial. The consumer does not have to know the powder to water ratio. Baby Barista fills the bottle with the appropriate amount of water based on the scoop dial entry.

Automatic water calculation is an embodiment of the Baby Barista. Prior art has relied on the consumer to be completely responsible for correlating powder to water ratios.

Temperature

The desired temperature range is between 95 and 105 degrees Fahrenheit. This is because the formula is being heated to body temperature to imitate breast milk. The range can also be extended, in one embodiment, to lower or higher temperatures.

Because the complete dissolution of powder is aided by the addition of warmed water, a heating coil or warming chamber is a component of the Baby Barista. In one embodiment, the Baby Barista's heating mechanism has a fixed set point. In one embodiment, it will only heat the water to a safe, predetermined temperature. In this embodiment, the mechanism will be unable to exceed that set point, thereby abolishing the risk of scalding an infant.

Water Quality

Water for infant formula preparation comes from one of three sources; bottled water, tap water or well water. Infant formula manufacturers recommend boiling water prior to serving it if there is any concern about contamination. This adds one more step to an already inconvenient process. There are also concerns about fluoridated water sources. According to the American Academy of Pediatrics, infants do not require fluoride in the first six months of life. This is why Gerber and other manufacturers have bottled water specifically for use with infant formula. Because this bottled water undergoes "an extensive, multi-step process to ensure consistent purity and quality" there are no longer concerns about contaminants. This special water is fluoride free. According to the American Dental Association, excess fluoride can lead to enamel fluorosis possibly affecting the appearance of teeth before eruption through the gums.

In one embodiment, the Baby Barista machine can use bottled purified water designed exclusively for pairing with infant formula.

Water Received in Machine

In one implementation, the capacity of the Baby Barista water chamber is three quarts. Other sizes are possible, but three quarts is 96 oz., the amount necessary to fill eight 12 oz baby bottles. The three quart embodiment allows an older infant to be fed every four hours for a full 24-hour period without requiring chamber refill.

In the case of a newborn requiring 2 oz of water per feeding, 48 feedings can be accomplished without the need to refill this tank. The holding capacity of the Baby Barista water chamber is an improvement over prior art.

Scoop Dial Dispensing

Instead of an ounce indicator, Baby Barista uses a scoop dial. The amount of formula being used is indicated on a dial. The denominations on the scoop dial will be 1, 2, 3, 4, 5, and 6. The numbers indicate the scoops of powder that have been manually dispensed into the formula disc. This dial will ensure that the proper amount of water is dispensed into the baby bottle and simplify the process as it will be unnecessary to correlate the scoop to water ratio.

The scoop dial will stay set for long periods of time on one denomination. Infants slowly advance their feeding quantity over weeks or months. This means that changing the number on the scoop dial is not something that will be routinely done, eliminating one of the steps in the order of operations. The dial can also be replaced with an input button, touch screen input, or the like, so long as the setting value is provided.

Mixing Water and Powder

The Baby Barista, unlike any prior art, agitates the water and powder in the bottle. This eliminates internal machine contamination. In one embodiment, the bottle is either placed on a vibrating plate, affixed to an elliptical motion agitating mechanism or placed in a cup that has a spinning plate under it. The bottle is placed slightly off center on this plate which causes the bottle to shake and the contents to be mixed thoroughly.

In one embodiment, the bottle can be attached to or located adjacent to a splashguard. The splashguard can simply insert into the bottle opening or can be screwed onto the top of the Bottle to eliminate or reduce splashing.

In more detail, "mixing" is a process where two or more substances enter a chamber where they are to be combined. In one embodiment, that chamber is a baby bottle. Agitation is one method used to combine compounds. The rounded corners of the baby bottle's base are ideal for mixing as they avoid stagnant areas that sharper corners could produce. Almost anything can be mixed, and generally the type of mixer or agitator used depends on the nature of the substances to be mixed. As noted herein, the agitation is of warm water with powdered baby formula.

In one embodiment, effective mixing of liquids requires the creation of multiple flow patterns in the fluid being mixed. This motion is imparted to a fluid "pocket". The momentum of this pocket will keep it in motion until either contacts the wall of the baby bottle, or runs into another moving pocket.

Therefore, motion is required for effective mixing. In one embodiment, motion can be identified as radial flow (outward from an agitator), axial flow (parallel to the agitator), or angular flow (parallel to the vessel wall in a horizontal plane). The first two types are, in one embodiment, essential for effective mixing. Angular flow, however is less desirable because it means that fluid pockets are moving in parallel but little mixing is occurring.

Liquid flow can further be defined as either laminar or turbulent. Laminar flow is where layers of fluid molecules slide past each other. (e.g., picture the sliding of a deck of cards at an angle). The flow is predictable and many formulas and studies for fluid mechanics are based on laminar flow. Laminar flow, sometimes known as streamline flow, occurs when a fluid flows in parallel layers, with no disruption between the layers. At low velocities the fluid tends to flow without lateral mixing. There are no cross currents perpendicular to the direction of flow, nor eddies or swirls of fluids. In laminar flow the motion of the particles of fluid is very orderly with all particles moving in straight lines parallel to the vessel walls.

Turbulent flow, on the other hand, is a random pattern where micro-pockets of fluid collide frequently with one another. New micro-pockets are continually formed from collisions, and random flow patterns result. This type of flow produces effective mixing. Common examples of turbulent flow are blood flow in arteries, oil transport in pipelines, lava flow, atmosphere and ocean currents, the flow through pumps and turbines, and the flow in boat wakes and around aircraft-wing tips.

The Baby Barista apparatus, in one embodiment, uses a tumbler-type model for agitation. Due to the need to prevent internal machine contamination a tumbler model will most effectively mix the warmed water with baby formula. Tumbler-type models are most useful when the objective is to break up clumps or agglomerates of material, in this case powdered infant formula. Here, the vessel itself is either rotated or oscillated back and forth. A cement mixer is a good example of this. Tumbler-type agitating devices are generally low maintenance; low wear devices that make this type of agitation cost effective and practical for food preparation machines.

Three different agitating methods are possible for the apparatus. Each method employs one or more of the principles described above allowing for complete dissolution of the powdered formula in warmed water at the conclusion of the agitation cycle.

Method One

Agitating method number one is referred to as the plate agitating method. In this application, the baby bottle sits on an agitating plate that resides on the base of the Baby Barista Machine. The agitating plate has a bottle holder affixed to it that secures the bottle and prevents slipping or sliding during agitation. The vibrating plate sends repetitive periodic oscillations of varying frequencies based on the amount of powder and water dispensed in the bottle, Agitating times vary and are volume dependent. This plate may also slide in a horizontal fashion along the base of the Baby Barista Machine if vibration alone is inadequate to achieve complete powder dissolution. The agitating plate and bottle holder are illustrated, as examples, in FIGS. 1E and 1F.

Method Two

Agitating method number two is referred to as the disc agitating method. In this application the baby bottle sits on a circular disc. The Baby bottle fits securely in a bottle holder that resides on top of the circular disc. The bottle holder is affixed in such a manner that it secures the bottle and prevents slipping or sliding during agitation. The bottle holder is placed slightly off center on the disc, thus employing the principle of eccentric motion. The disc beneath the bottle holder spins at a rate that causes the bottle to oscillate vigorously enough to completely dissolve the powdered infant formula in warmed water. Should the oscillation from the spinning disc be inadequate to accomplish this, it is possible that the plate may additionally move parallel to the base of the Baby Barista Machine or in a three-dimensional figure eight pattern. This pattern produces a rhythmic pulsating motion as demonstrated by the Paul Schatz principle. An example of this application is demonstrated in FIG. 7.

Method Three

Agitating method number three is referred to as the fixed arm agitating method. In this application, an arm-like apparatus is affixed to the housing unit of the Baby Barista Machine. Attached to that arm is a semi-circular, hook-like bottle holder. The bottle fits securely into this bottle holder to prevent slipping or sliding of the bottle during agitation. The holder can take on various configurations, and the handle shown is provided for an example only. For instance, the handle can be defined by a formed grip into which a bottle is secured, or a clamp device of suitable construction for holding a bottle. During agitation, the base of the baby bottle is tipped left and right at a predetermined angle. For the purposes of this discussion the angle will be forty-five degrees. The base of the bottle will travel in an elliptical path for a predetermined amount of time based on the volume of water and powder that is being mixed. Complete dissolution of powdered infant formula in warmed water will result. An example of application is shown in FIG. 8.

Feeding Tracker

The feeding tracker is another novel component of Baby Barista. Accurately spacing feedings is essential to the health and happiness of any infant. Parents often have to write down the time of the infant's last feeding in order to plan for the next one. The Baby Barista Feeding Tracker allows the user to choose the desired feeding interval from selections listed on the Feeding Menu on the LCD screen. For example, if the interval is two hours, that is selected on the menu and an alarm sounds when the next feeding is due. The feeding alarm can be activated or deactivated as needed by the end user. The feeding alarm is an embodiment of the present invention.

FIG. 9 illustrates a block diagram of the systems, which may be used in one embodiment, to define that appliance. As shown, a formula disc 10 is provided with a number of slots 110. The number of slots 110 can be filled with formula 110a, and allowed to drop vertically downward into bottle 142. Water is provided in a compartment 120 and is coupled to a delivery mechanism 122 that passes or is connected to a heating mechanism 124. The water is delivered through a delivery conduit 126 that has an end that is angled when directed into bottle 142. Bottle 142 is configured to sit over an agitator 140. Bottle 142 is shown in dashed lines, as bottle 142 is not part of the appliance. A position control 128 is shown coupled to the formula disc 10, which assist in moving the formula disc 10 to the proper location to allow a slot 110 to line up with the path that will drop the formula down to bottle 142. Formula scoop setting 130 represents the input provided to control circuitry 132. Formula scoop setting, as shown in FIG. 1A illustrates a setting of 1 or 6 scoops, which may be present in each of the slots of the formula disc 10. The control circuitry 132, is defined by any number of circuit configurations. The circuit configuration can be an integrated circuit, a PC board, or a combination of PC boards and circuitry. The control circuitry 132 can also be programmed and have memory or a processor that will allow storage of a routine or programs for defining when feeding our desired, and bottle making is to start. Control circuitry 132 is therefore coupled in a functional and control configuration to the water container 120, the delivery mechanism 122, the heating mechanism 124, the delivery conduit 126, the position control 128, and the input controls 134. As described above, the input controls 134 are provided so that a user 136 can define feeding times, and settings for the feeding times. As mentioned above, the input controls can be defined as buttons or in the form of a touchscreen.

FIG. 10 illustrates a flowchart process for setting up the appliance, in accordance with one embodiment of the present invention. The method includes providing water in a machine fluid holder, in step 200. In step 202, a lid of the machine is opened to expose and remove a formula disc 10. As noted above, the removal formula disc 10 can, in one embodiment, be fixed to the appliance instead of being removable. In operation 204, each receptacle (e.g., slot), in the formula disc 10 is filled with one or more scoops of formula. In operation 206, the formula scoop setting on the machine can be set, or can be previously set, to indicate the number of scoops filled in each of the receptacles of the formula disc. In operation 208, the user can input the feed times on the machine to activate the machine to operate. The machine will make the number of bottles equal to the number of filled slots. Operation 210 includes providing a machine with an empty bottle, which is an operation provided by a user. The bottle is then made operation 212, and an alarm can be triggered to indicate that the bottle is ready in operation 214.

FIG. 11 illustrates an embodiment where a bottle 212 is made, in accordance with one embodiment of the present invention. The operation begins at 250 where water is flown from the fluid holder through the heating mechanism. The water is provided based on the settings of the formula scoop setting, as provided in 252. Operation 254 provides that the water is heated to a temperature as it is delivered to the bottle positioned at the base of the machine, where the bottle is in contact with an agitator. Operation 256 includes setting the formula disc to a position that allows direct drop of one or more scoops of formula present in a receptacle (slot) of the formula disc. Operation 258 allows the formula to settle for a period of time, which is optional. Operation 260 provides for activation of the agitator to transfer motion energy to the bottle. The motion energy causes a mixing of the formula with the water. In operation 262, the agitation is terminated after a predetermined time that ensures proper mixing of formula with the water, based on the number of scoops dropped into the bottle.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

The invention claimed is:

1. An apparatus for preparing infant formula to be supplied to a bottle, comprising:
    a housing having a shape for integrating together components of the apparatus;
    a fluid reservoir for holding fluid and configured to be coupling to the housing;
    a removable formula disc disposed at a first location of the housing, the first location defined above a dispense location of the bottle, the removal formula disc having a top end and a dispense end, the removal formula disc further including a plurality of holes for holding the infant formula in a powder state, each of the plurality of holes configured to hold one or more measured scoops of the infant formula;
    an end plate coupled to the dispense end of the removable formula disc, the end plate having a dispense hole, such that the end plate is rotatable to enable alignment of the dispense hole to any one of the plurality of holes of the removable formula disc;
    a scoop dial selection disposed on the housing, the scoop dial selection being settable to correspond to the one or more measured scoops of the infant formula present in at least one of the plurality of holes of the removable formula disc;
    a circuit for controlling rotation of the end plate to cause a vertical drop of the formula, when present, directly into the bottle and to cause a delivery of the fluid, when present in the reservoir, directly into the bottle, the circuit further controlling an amount of the fluid to be dispensed into the bottle based on the setting of the scoop dial selection; and
    an agitation unit for holding the bottle, when present, the agitation unit is configured to move the bottle to cause a mixing of the formula and fluid.

2. The apparatus of claim 1, wherein the apparatus further includes a heating element, the heating element is configured for heating of the fluid upon delivery to the bottle.

3. The apparatus of claim 1, wherein the agitation unit is one of a container that is off-center or a vibrating plate.

4. The apparatus of claim 1, wherein the agitation unit has an arm that affixes to the bottle, and the arm is configured to produce motion.

5. The apparatus of claim 1, wherein the delivery of the fluid into the bottle is through an angled spout that is directed into the bottle, the angle being relative to a length dimension of the bottle.

6. An apparatus for preparing infant formula to be supplied to a bottle, comprising:
    a housing having a shape for integrating together components of the apparatus;
    a fluid reservoir for holding fluid and configured to be coupling to the housing;
    a formula disc disposed at a first location of the housing, the first location defined above a dispense location of the bottle, the formula disc having a top end and a dispense end, the formula disc further includes a plurality of slots for holding the infant formula in a powder state, each of the plurality of holes configured to hold one or more measured scoops of the infant formula;
    an end plate coupled to the dispense end of the formula disc, the end plate having a dispense hole, such that the end plate is rotatable relative to the formula disc to enable alignment of the dispense hole to any one of the plurality of slots of the formula disc;
    a scoop selector provided by an interface of the housing, the scoop selector being settable to correspond to the one or more measured scoops of the infant formula present in at least one of the plurality of holes of the formula disc;
    a circuit for controlling rotation of the end plate or formula disc to cause a vertical drop of formula when present in one of the slots of the formula disc into the bottle and to cause a delivery of the fluid, when present in the reservoir, directly into the bottle, the circuit further programming an amount of the fluid to be dispensed into the bottle based on the setting of the scoop selector; and an agitation device for generating movement of the bottle when present, the movement configured for causing a mixing of the formula and fluid within the bottle.

7. An apparatus for preparing infant formula to be supplied to a bottle, comprising:
- a housing having a shape for integrating together components of the apparatus;
- a fluid reservoir for holding fluid and configured to be coupling to the housing;
- a formula disc disposed at a first location of the housing, the first location defined above a dispense location of the bottle, the formula disc having a top end and a dispense end, the formula disc further includes a plurality of slots for holding the infant formula in a powder state, each of the plurality of holes configured to hold one or more measured scoops of the infant formula;
- a scoop selector provided by an interface of the housing, the scoop selector being settable to correspond to the one or more measured scoops of the infant formula present in at least one of the plurality of holes of the formula disc;
- a circuit for controlling rotation of the formula disc to cause a vertical drop of formula when present in one of the slots of the formula disc into the bottle and to cause a delivery of the fluid, when present in the reservoir, directly into the bottle, the circuit further controlling an amount of the fluid to be dispensed into the bottle based on the setting of the scoop selector; and
- an agitation device for generating movement of the bottle when present, the movement configured for causing a mixing of the formula and fluid within the bottle.

8. The apparatus of claim 7, further comprising:
- an end plate coupled to the dispense end of the formula disc, the end plate having a dispense hole, such that the end plate is rotatable relative to the formula disc to enable alignment of the dispense hole to any one of the plurality of slots of the formula disc.

* * * * *